(12) United States Patent
Shibuya et al.

(10) Patent No.: US 6,509,123 B1
(45) Date of Patent: Jan. 21, 2003

(54) GEL ELECTROLYTE AND GEL ELECTROLYTE CELL

(75) Inventors: Mashio Shibuya, Miyagi (JP); Tsuyonobu Hatazawa, Miyagi (JP); Tomitaro Hara, Miyagi (JP); Goro Shibamoto, Kanagawa (JP); Shuji Goto, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/672,881

(22) Filed: Sep. 28, 2000

(30) Foreign Application Priority Data

Sep. 30, 1999 (JP) .............................. 11-279790

(51) Int. Cl.[7] .................................. H01M 6/18
(52) U.S. Cl. ................ 429/303; 429/188; 429/300; 429/301
(58) Field of Search .................. 429/188, 300, 429/301, 303

(56) References Cited

U.S. PATENT DOCUMENTS 6,235,433 B1 * 5/2001 Amano et al. .............. 252/62.2

FOREIGN PATENT DOCUMENTS

JP 9270271 A * 10/1997 .......... H01M/10/40

* cited by examiner

*Primary Examiner*—Carol Chaney
*Assistant Examiner*—Dah-Wei D. Yuan
(74) *Attorney, Agent, or Firm*—Sonnenschein, Nath & Rosenthal

(57) ABSTRACT

The present invention provides a gel electrolyte cell including a non-aqueous electrolytic solution containing lithium-containing electrolyte salt solved in a non-aqueous solvent and made into a gel state by a matrix polymer, and the gel electrolyte contains vinylene carbonate or derivative thereof in the amount not less than 0.05 wt % and not greater than 5 wt %. This gel electrolyte exhibits an excellent chemical stability with the negative electrode, strength, and liquid-retention characteristic. This gel electrolyte enables to obtain a gel electrolyte cell satisfying the cell capacity, cycle characteristic, load characteristic, and low-temperature characteristic.

11 Claims, 2 Drawing Sheets

GEL ELECTROLYTE AND GEL ELECTROLYTE CELL

RELATED APPLICATION DATA

The present application claims priority to Japanese Application No. P11-279790 filed Sep. 30, 1999, which application is incorporated herein by reference to the extent permitted by law.

BACKGROUND OF THE INVENTION

1. Field of the Invention

The present invention relates to a gel electrolyte as a non-aqueous electrolytic solution containing lithium-containing electrolyte salt solved in a non-aqueous solvent which is made into a gel state by a matrix polymer and a gel electrolyte cell using the gel electrolyte.

2. Description of the Prior Arts

Cells are becoming more important industrially as an electric source for portable electronic apparatuses. In order to reduce the size and weight of apparatuses, cells should be light in weight and should not occupy a large space in the apparatuses. For this, the most appropriate cell is a lithium cell having a large energy density and a large output density.

Among the lithium cells, most hopeful are those having a large freedom or flexibility of the shape, or a thin sheet type cell having a large area or a thin card type cell having a small area. However, in the case of a conventional cell using a metal can as a case, it is difficult to produce a thin cell having a large area.

In order to solve this problem, a study has been made on cells using an organic and inorganic solid electrolyte and a gel electrolyte using a polymer gel. In these cells, the electrolyte is fixed, which in turn fixes the thickness of the electrolyte, and there is an adhesive force between the electrode and the electrolyte which can maintain a contact. Therefore, there is no need of using a metal case for containing the electrolyte or applying a pressure to the cell element. Accordingly, it is possible to use a film-shaped case and make the cell thin.

Since the solid electrolyte has an insufficient ion conductivity, it is still difficult to use it in cells. More promising candidate is the gel electrolyte. Its case may be a multi-layered film made from a polymer film and a thin metal film. One of the most hopeful case is a damp-proof multi-layered film made from a heat sealing resin layer and a metal foil layer which can easily be sealed by a hot seal. The multi-layered film itself has an excellent strength and air tightness and is lighter, thinner, and cheaper than a metal case.

However, the non-aqueous solvent in the gel electrolyte cannot constitute a gel electrolyte unless the solvent can be obtain a compatibility with matrix polymer. Moreover, when a film is used as a cell case and the solvent has a low boiling point, if the cell is put under a high temperature, the solvent vapor increase the inner pressure of the cell and may cause swelling. Accordingly, the solvent selection is limited to a small range.

Solvents having a low boiling point used in lithium-ion cells such as dimethyl carbonate, ethylmethyl carbonate, diethyl carbonate, and the like have a high freezing point and a low viscosity, which helps to increase the ion conductivity in the electrolyte at a low temperature. However, because of the solvent selection limit due to the compatibility and boiling point, these cannot be used in a large amount in the gel electrolyte cell using a multi-layered film as a case.

The solvent of the gel electrolyte for cells may be ethylene carbonate, propylene carbonate, and the like as materials having a high boiling point and not causing decomposition which may deteriorate the cell performance. Furthermore, we have developed a matrix polymer having an excellent compatibility with these solvents, excellent chemical stability, gel strength, and excellent liquid-retention characteristic, i.e., a copolymer with polyvinylidene fluoride copolymerized with hexafluoropropylene in a range not greater than 7.5 wt %.

Moreover, when using as a non-aqueous solvent a mixture of ethylene carbonate and propylene carbonate, if the content of propylene carbonate is large, the low-temperature characteristic and the load characteristic are preferable but the initial charge/discharge efficiency is insufficient, which results in a small cell capacity and deteriorates the cycle characteristic. Thus, it has been difficult to produce a gel electrolyte cell which is excellent in all of the cell capacity, cycle characteristic, the load characteristic, and the low-temperature characteristic.

SUMMARY OF THE INVENTION

It is therefore an object of the present invention to provide a gel electrolyte excellent in chemical stability, strength, and liquid-retention characteristic and a gel electrolyte cell using the gel electrolyte which can satisfy all of the cell capacity, cycle characteristic, load characteristic, and low-temperature characteristic.

The gel electrolyte according to the present invention includes a non-aqueous electrolytic solution containing lithium-containing electrolyte salt solved in a non-aqueous solvent and made into a gel state by a matrix polymer, wherein the gel electrolyte contains vinylene carbonate or derivative of vinylene carbonate in the amount not less than 0.05 wt % and not greater than 5 wt %.

The aforementioned gel electrolyte according to the present invention contains vinylene carbonate of a derivative of vinylene carbonate in the amount not less than 0.05 wt % and not greater than 5 wt % with respect to the non-aqueous electrolytic solution and accordingly, exhibits an excellent chemical stability of the negative electrode and the gel electrolyte. A gel electrolyte cell using this gel electrolyte exhibits an improved initial charge/discharge efficiency and capacity.

Moreover, the gel electrolyte cell according to the present invention includes: a negative electrode having a lithium metal or lithium alloy or carbon material capable of doping/dedoping lithium; a positive electrode having a composite oxide of lithium and a transition metal and a gel electrolyte arranged between the positive electrode and the negative electrode. The gel electrolyte is a non-aqueous electrolytic solution containing lithium-containing electrolyte salt solved in a non-aqueous solvent and made into a gel state by a matrix polymer, and contains vinylene carbonate or a derivative of vinylene carbonate in the amount not less than 0.05 wt % and not greater than 5 wt % with respect to the non-aqueous electrolytic solution.

In the aforementioned gel electrolyte cell according to the present invention, the gel electrolyte contains vinylene carbonate or a derivative of vinylene carbonate in the amount not less than 0.05 wt % and not greater than 5 wt % with respect to the non-aqueous electrolytic solution and accordingly, the gel electrolyte exhibits an excellent chemical stability with the negative electrode. A gel electrolyte cell using such gel electrolyte exhibits an excellent initial charge/discharge efficiency and satisfies the cell capacity as well as suppresses swelling caused by gas generation and prevent change in cell dimensions and shape.

DETAILED DESCRIPTION OF PREFERRED EMBODIMENTS

Description will now be directed to an embodiment of the present invention.

Figure 1:
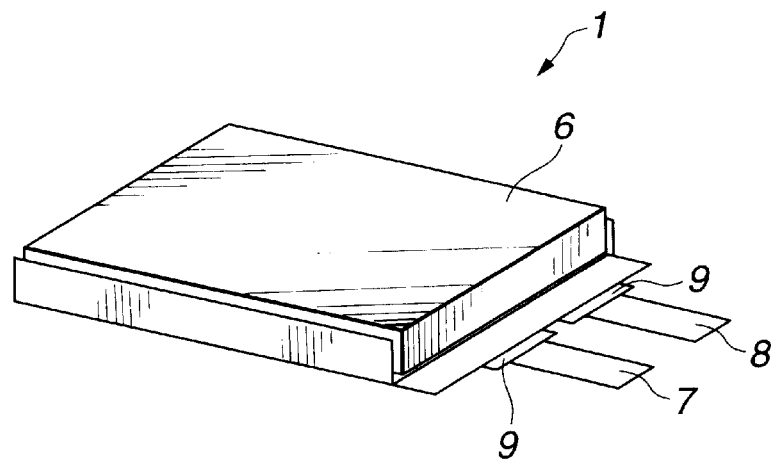
FIG. 1 is a perspective view showing a configuration example of a gel electrolyte cell according to the present invention.
Figure 2:
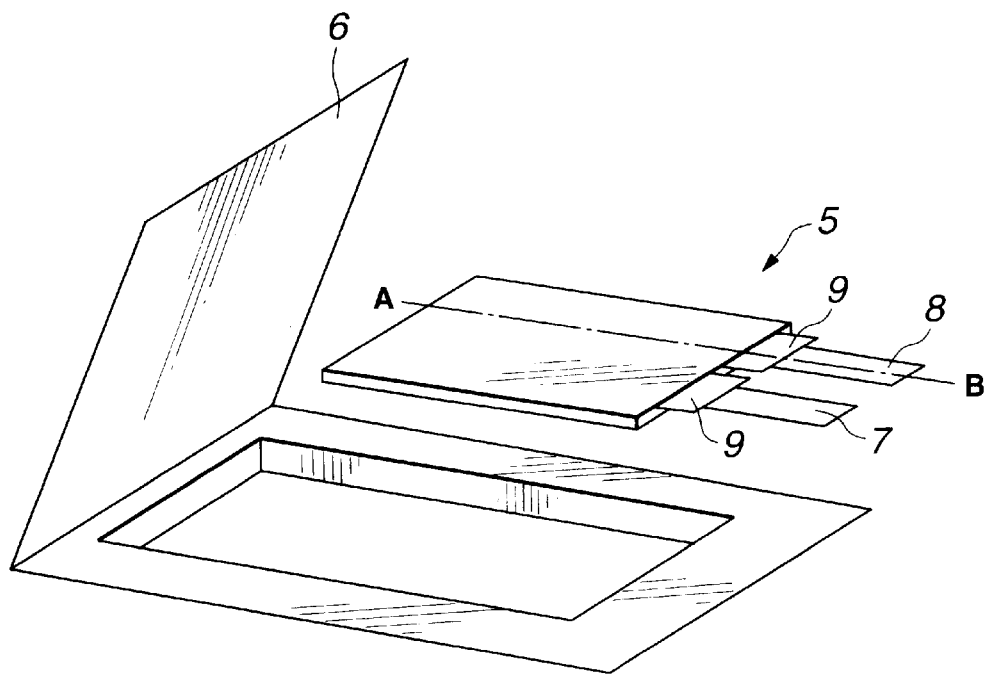
FIG. 2 is a perspective view showing a rolled electrode body to be put into a casing film.
Figure 3:
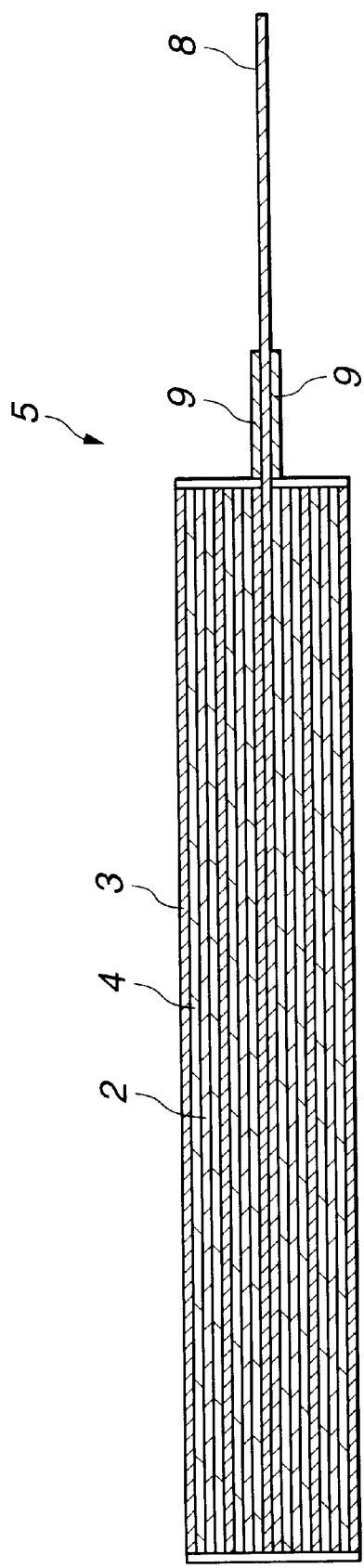
FIG. 3 is a cross sectional view about the line A–B in FIG. 2.

FIG. 1 to FIG. 3 show a configuration example of the gel electrolyte cell according to the present embodiment. As shown in FIG. 3, this gel electrolyte cell 1 includes a strip positive electrode 2, a strip negative electrode 3 arranged to oppose to the positive electrode 2, and a gel electrolyte layer 4 arranged between the positive electrode 2 and the negative electrode 3. In this gel electrolyte cell 1, the positive electrode 2 and the negative electrode 3 are layered via the gel electrolyte layer 4 and rolled in the longitudinal direction, and the rolled electrode body 5 shown in FIG. 2 and FIG. 3 is covered by a casing film 6 made from an insulating material and sealed. A positive electrode terminal 7 is connected to the positive electrode 2 and a negative electrode terminal 8 is connected to the negative electrode 3. The positive electrode terminal 7 and the negative electrode terminal 8 are inserted into a sealing portion which is a peripheral portion of the casing film 6.

The positive electrode 2 includes a positive electrode active material layer containing a positive electrode active material and formed on the both sides of the positive electrode current collector. The positive electrode current collector is, for example, a metal foil such as an aluminum foil.

The positive electrode active material layer is formed as follows. Firstly, a positive electrode composite agent is prepared by uniformly mixing, for example, a positive electrode active material, a conductive material, and a binding material. This positive electrode composite agent is dispersed in a solvent to obtain a slurry state. This slurry is uniformly applied onto the positive electrode current collector by the doctor blade method or the like and dried under a high temperature to eliminate the solvent. Here, the positive electrode active material, the conductive material, the binding material, and the solvent should be dispersed uniformly and their mixing ratio is not limited to a particular one.

Here, the positive electrode active material is a composite oxide of lithium and a transition metal element. More specifically, the positive electrode material may be $LiCoO_2$, $LiNiO_2$, $LiMn_2O_4$, $LiAlO_2$, and the like. It is also possible to use two or more transition metal elements such as $LiNi_{0.5}Co_{0.5}O_2$ and $LiNi_{0.8}Co_{0.2}O_2$.

Moreover, the conductive material may be, for example, a carbon material. Moreover, the binding material may be, for example, polyvinylidene fluoride. Moreover, the solvent may be, for example, N-methylpyrrolidone.

Moreover, the positive electrode 2 has at its other end in the longitudinal direction the positive electrode terminal 7 connected by the spot welding or supersonic welding. This positive electrode terminal 7 is preferably a metal foil in a network shape but may be other than metal if it is stable electro-chemically and chemically, and electrically conductive. The positive electrode terminal 7 may be made from aluminum, or the like.

The positive electrode terminal 7 preferably protrudes in the same direction as the negative electrode terminal 8 but may be in any direction if no short-circuit is caused and no problem is caused in the cell performance. Moreover, the connection position and the connection method of the positive electrode terminal 7 may be other than the aforementioned if electrical contact can be obtained.

Moreover, the negative electrode 3 includes a negative electrode active material layer containing a negative electrode active material and formed on the both sides of the negative electrode current collector. The negative electrode current collector may be, for example, a metal foil such as a copper foil.

The negative electrode active material layer is formed as follows. Firstly, a negative electrode composite agent is prepared by uniformly mixing a negative electrode active material, and a conductive material and a binding material as are required. The negative electrode composite agent is dispersed in a solvent to obtain a slurry. The slurry is uniformly applied onto the negative electrode current collector by the doctor blade method or the like and dried under a high temperature to eliminate the solvent. Here, the negative electrode active material, the conductive material, the binding material, and the solvent should be dispersed uniformly and the mixing ratio is not limited to a particular one.

The negative electrode active material may be a lithium metal, a lithium alloy, or a carbon material which can dope and dedope lithium. More specifically, the carbon material capable doping and dedoping lithium may be graphite, non-graphitizable carbon, graphitizable carbon, and the like.

Moreover, the conductive material may be, for example, a carbon material. Moreover, the binding material may be, for example, polyvinylidene fluoride. Moreover, the solvent may be, for example, N-methylpyrrolidone.

Moreover, the negative electrode 3 has at its other end in the longitudinal direction the negative electrode terminal 8 connected by the spot welding or supersonic welding. The negative electrode terminal 8 is preferably a metal foil in a network shape but may be other than metal if it is stable electro-chemically and chemically, and electrically conductive. The negative electrode terminal 8 may be made from copper, nickel, or the like.

The negative electrode terminal 8 preferably protrudes in the same direction as the positive electrode terminal 7 but may be in any direction if no short circuit is caused and no problem is caused in the cell performance. Moreover, the connection position and connection method of the negative electrode terminal 8 may be other than the aforementioned if electrical contact can be obtained.

The gel electrolyte contains a non-aqueous solvent, an electrolyte salt, and matrix polymer. Moreover, as will be detailed later, in the gel electrolyte cell 1 of the present invention, vinylidene carbonate or its derivative is added to the gel electrolyte.

The non-aqueous solvent may be known solvents used as non-aqueous solvent of the non-aqueous electrolytic solution. More specifically, there can be exemplified ethylene carbonate, propylene carbonate, γ-butyrolactone, dimethyl carbonate, diethyl carbonate, ethylmethyl carbonate, dipropyl carbonate, ethylpropyl carbonate, or these carbonate in which hydrogen is replaced by halogen.

Each of these solvents can be used solely or in combination with the others with a predetermined mixing ratio. Among them, it is especially preferable to use a mixed solvent using ethylene carbonate and propylene carbonate with a mixing ratio of 15:85 to 75:25 by weight ratio. When the content of the ethylene carbonate exceeds this range, the low-temperature characteristic of the gel electrolyte cell 1 is deteriorated. Moreover, when the content of the propylene carbonate exceeds the aforementioned range, it becomes impossible to obtain a preferable initial charging/discharging efficiency, cell capacity, or cycle characteristic.

The electrolyte salt maybe those which can be solved in the aforementioned non-aqueous solvents. Cation may be alkali metal ion such as lithium or alkaline earth metal ion. Anion may be $BF_4^-$, $PF_6^-$, $CF_3SO_3^-$, $(CF_3SO_2)_2 N^-$, $(C_2F_5SO_2)_2N^-$, or the like. These cations and anions are used in combination to obtain an electrolyte salt. The electrolyte salt may be, for example, $LiPF_6$, $LiBF_4$, $LiN(CF_3SO_2)_2$, $LiN(C_2F_5SO_2)_2$, $LiClO_4$, or the like.

It should be noted that the electrolyte salt concentration may be any if solved in the aforementioned solvents. However, it is preferable that the lithium ion concentration is not less than 0.4 mol/kg and not greater than 1.0 mol/kg with respect to the non-aqueous solvent. When the lithium ion concentration exceeds 1.0 mol/kg, this deteriorates the low-temperature characteristic and the cycle characteristic of the gel electrolyte cell 1 Moreover, when the lithium ion concentration is less than 0.4 mol/kg, it is impossible to assure a sufficient capacity.

The matrix polymer gelates the non-aqueous electrolytic solution containing the aforementioned electrolyte salts solved in the aforementioned non-aqueous solvents. The matrix polymer may contain as a repetition unit polyvinylidene fluoride, polyethylene oxide, polypropylene oxide, polyacrylonitrile, polymethacrylonitrile. Each of these polymers may be used solely or in combination with the others.

Among them, it is especially preferable to use, as the matrix polymer, polyvinylidene fluoride or a copolymer of polyvinylidene fluoride in combination with hexafluoropropylene not greater than 7.5%. Such polymers have a number-average molecular weight of 500000 to 700000 or a weight-average molecular weight of 210000 to 310000, and a intrinsic viscosity of 1.7 to 2.1.

The casing film 6 airtightly wraps the rolled electrode body 5 including the positive electrode 2 and the negative electrode 3 layered via the gel electrolyte layer 4 and rolled in the longitudinal direction. This casing film is made from, for example, a damp-proof insulating multi-layered film having an aluminum foil sandwiched by a pair of resin films.

In the gel electrolyte cell according to the present invention, vinylene carbonate or its derivative is added to the gel electrolyte. By adding vinylene carbonate or its derivative to the gel electrolyte, it is possible to enhance the chemical stability of the gel electrolyte with respect to the negative electrode. By using the gel electrolyte having an excellent chemical stability for the negative electrode, it is possible to improve the initial charge/discharge efficiency of the gel electrolyte cell 1 and to obtain a high cell capacity.

Moreover, as has been described above, the gel electrolyte cell has an advantage that a light multi-layered film can be used for the case. However, there has been a great problem that like in the case of the lithium-ion secondary cell, if a gas is generated by decomposition of the non-aqueous solvent at the initial charging, the gel electrolyte cell using the multi-layered film for the case swells.

The inventor of the present invention has found that addition of vinylene carbonate or its derivative to the gel electrolyte cell, in addition to the aforementioned effects, has an effect to suppress generation of gas accompanying charging and to prevent swelling of the cell.

The vinylene carbonate or its derivative to be added is preferably in a range not less than 0.05 wt % and not greater than 5 wt % against the solvent in the gel electrolyte. When the content of the vinylene carbonate is less than 0.05 wt %, it is impossible to obtain a sufficient effect to increase the charge/discharge efficiency, disabling to obtain a high cell capacity or initial charge/discharge efficiency. Moreover, when the content of vinylene carbonate exceeds 5 wt %, the discharge characteristic at a low temperature is lowered.

Accordingly, by defining the content of vinylene carbonate or its derivative in the range not less than 0.05 wt % and not greater than 5 wt % with respect to the solvent of the gel electrolyte, it is possible to increase the charge/discharge efficiency and obtain a high cell capacity and cycle characteristic without lowering the discharge characteristic at a low temperature. Furthermore, more preferably, the content of the vinylene carbonate or its derivative to be added is in the range not less than 0.5 wt % and not greater than 3 wt % with respect to the solvent in the gel electrolyte. By defining the content of the vinylene carbonate in the range not less than 0.5 wt % and not greater than 3 wt % with respect to the solvent in the gel electrolyte, it is possible to further enhance the aforementioned characteristics.

Furthermore, it is preferable to add difluoroanisole (DFA) to the non-aqueous electrolytic solution constituting the gel electrolyte. By adding difluoroanisole to the non-aqueous electrolytic solution, it is possible to enhance the charge/discharge efficiency of the gel electrolyte 1 and to obtain a high discharge capacity. The content of difluoroanisole is preferably in the range not less than 0.2 wt % and not greater than 2 wt % with respect to the non-aqueous electrolytic solution.

In the gel electrolyte cell 1 having the aforementioned configuration according to the present invention, vinylene carbonate or its derivative is added to the gel electrolyte and accordingly, the initial charge/discharge efficiency of the cell is improved, a high cell capacity can be obtained, and the cycle characteristic is excellent. Moreover, in the gel electrolyte cell 1 according to the present invention in which vinylene carbonate or its derivative is added to the gel electrolyte, gas generation accompanying the charge/discharge is suppressed. Accordingly, even if the multi-layered film is used for the case, there is no danger of swelling of the cell and it is possible to assure a high reliability.

It should be noted that as shown in FIG. 1 to FIG. 3, it is preferable that a resin piece 9 be arranged at the contact portion between the casing film 6, the positive electrode terminal 7, and the negative electrode terminal 8. By providing the resin piece 9 at the contact portion between the casing film 6, the positive electrode terminal 7, and the negative electrode terminal 8, it is possible to prevent short-circuit which may be caused by burr of the casing film 6 and to increase the adhesiveness between the casing film 6, the positive electrode terminal 7, and the negative electrode terminal 8.

It should be noted that the gel electrolyte cell 1 may include a separator in the gel electrolyte layer 4. By arranging the separator in the gel electrolyte layer 4, it is possible to prevent an internal short-circuit due to a contact between the positive electrode 2 and the negative electrode 3.

Moreover, in the aforementioned embodiment, the gel electrolyte cell 1 includes the strip positive electrode 2 and the strip negative electrode 3 layered via the gel electrolyte layer 4 and rolled in the longitudinal direction into a rolled electrode body 5. However, the present invention is not to be limited to this but may be a layered type electrode body including a positive electrode and a negative electrode layered via a gel electrolyte layer or a folded type electrode body without rolling.

The aforementioned gel electrolyte cell 1 according to the present embodiment may have a cylindrical shape, an angular shape, or the like and is not to be limited to a particular shape or size, allowing a thin type, large type, and the like. Moreover, the present invention maybe applied to a primary cell as well as to a secondary cell.

EXAMPLES

In order to confirm the effects of the present invention, the gel electrolyte cell having the aforementioned configuration was prepared and evaluated in its characteristics.

<Sample 1>

Firstly, a positive electrode was prepared as follows.

In order to prepare a positive electrode, a positive electrode composite agent was prepared by dispersing 92 wt % of lithium cobaltate ($LiCoO_2$), 3 wt % of polyvinylidene fluoride powder, and 5 wt % of graphite powder in N-methylpyrrolidone to obtain a slurry. The positive composite agent in the slurry state was applied to both surfaces of an aluminum foil to serve as the positive electrode collector and dried at 100° C. under a reduced pressure for 24 hours to form a positive electrode active material layer, which was pressurized-molded by a roll press into a positive electrode sheet. The positive electrode sheet was cut into a strip of 50 mm×300 mm serving as a positive electrode. An aluminum lead was welded to non-active material layer portion of the positive electrode collector, so as to serve as a positive electrode terminal.

Next, a negative electrode was prepared as follows.

The negative electrode was prepared by dispersing 91 wt % of artificial graphite and 9 wt % of polyvinylidene fluoride powder in N-methylpyrrolidone to obtain a negative electrode composite agent in slurry. This negative electrode composite agent was uniformly applied onto the both surfaces of a copper foil to serve as a negative electrode collector and dried at 120° C. under a reduced pressure for 24 hours to form a negative electrode active material layer, which was pressurized-molded by a roll press into a negative electrode sheet. The negative electrode sheet was cut into a strip of 52 mm×320 mm to serve as a negative electrode. A nickel lead was welded to a non-active material layer portion of the negative electrode collector, so as to serve as a negative electrode terminal.

Then, a gel electrolyte layer was formed on the positive electrode and the negative electrode thus prepared. The gel electrolyte layer was formed as follows. Firstly, polyvinylidene fluoride containing hexafluoropropylene copolymerized at a ratio of 6.9%, non-aqueous electrolytic solution, and dimethyl carbonate were mixed, agitated, and solved to obtain a sol polymer electrolytic solution.

Here, the non-aqueous electrolytic solution was prepared by solving 0.85 mol/kg of $LiPF_6$ in a mixture solution of ethylene carbonate (EC) and propylene carbonate (PC) mixed with a mixing ratio of 6:4. Furthermore, 1 wt % of 2,4-difluoroanisole (DFA) and 0.5 wt % of vinylene carbonate (VC) were added.

Next, the sol polymer electrolytic solution obtained was uniformly applied to both surfaces of the positive electrode and the negative electrode and dried to eliminate the solvent. Thus, a gel electrolyte layer was formed on the both surfaces of the positive electrode and the negative electrode.

Next, the strip positive electrode having the gel electrolyte layer on its both surfaces and the strip negative electrode having the gel electrolyte layer on its both surfaces are layered to obtain a layered body, which was rolled in the longitudinal direction to obtain a rolled electrode body.

Lastly, the rolled electrode body was sandwiched by a casing film including an aluminum foil sandwiched by a pair of resin films. The outer periphery of the casing film was fused by heat under a reduced pressure for sealing and the rolled electrode body was sealed in the casing film. It should be noted that a resin piece was attached to the positive electrode and the negative electrode and those portions were sandwiched by the sealing portion of the casing film. Thus, the gel electrolyte cell was complete.

<Sample 2> to <Sample 69>

Gel electrolyte cells were prepared in the same way as Sample 1 except for changing the composition of the non-aqueous electrolytic solution constituting the sol electrolytic solution as shown in Tables 1 to 4.

It should be noted that Sample 40 uses a matrix polymer prepared by a mixture of polyacrylonitrile and polymethacrylonitrile. Polyacrylonitrile having a molecular weight of 200000, polymethacrylonitrile having a molecular weight of 180000, ethylene carbonate, propylene carbonate, and $LiPF_6$ were mixed at a weight ratio of 1:1:9:9:1.7 and the polymer was dissolved at 90° C. This was applied to the electrode in the same way as Sample 1 and gradually cooled to obtain a gel state. The strip positive electrode and the strip negative electrode each having the gel electrolyte layer are layered via a separator made from a porous polyolefine to obtain a layered body, which was rolled in the longitudinal direction to obtain a rolled electrode body. This rolled electrode body was sealed in the casing film in the same way as Sample 1.

Samples 1 to 69 have solvent compositions of non-aqueous electrolytic solution and vinylene carbonate concentrations as shown below. Conditions different from those of Sample 1 such as the electrode material and the electrolyte salt are also shown in Tables below. The conditions are same as Sample 1 unless otherwise specified.

It should be noted that Table 1 below shows the non-aqueous electrolytic solution composition of cell in Samples 1 to 15. Moreover, Table 2 shows non-aqueous electrolytic solution composition of cell in Samples 16 to 40. Moreover, Table 3 shows non-aqueous electrolytic solution composition of cell in Samples 41 to 54. Moreover, Table 4 shows non-aqueous electrolytic solution composition of cell in Samples 55 to 69.

TABLE 1

|  | EC ratio (wt %) | PC ratio (wt %) | VC added (wt %) |
| --- | --- | --- | --- |
| Sample 1 | 60 | 40 | 0.5 |
| Sample 2 | 15 | 85 | 0.5 |
| Sample 3 | 75 | 25 | 0.5 |
| Sample 4 | 60 | 40 | 1.0 |
| Sample 5 | 15 | 85 | 1.0 |
| Sample 6 | 75 | 25 | 1.0 |
| Sample 7 | 60 | 40 | 2.0 |
| Sample 8 | 15 | 85 | 2.0 |
| Sample 9 | 75 | 25 | 2.0 |
| Sample 10 | 60 | 40 | 3.0 |
| Sample 11 | 15 | 85 | 3.0 |
| Sample 12 | 75 | 25 | 3.0 |
| Sample 13 | 60 | 40 | 5.0 |
| Sample 14 | 15 | 85 | 5.0 |
| Sample 15 | 75 | 25 | 5.0 |

TABLE 2

| | EC ratio (wt %) | PC ratio (wt %) | VC added (wt %) | Other conditions |
|---|---|---|---|---|
| Sample 16 | 60 | 40 | 1.0 | LiPF$_6$: 0.4 mol/kg |
| Sample 17 | 60 | 40 | 1.0 | LiPF$_6$: 0.7 mol/kg |
| Sample 18 | 60 | 40 | 1.0 | LiPF$_6$: 1.0 mol/kg |
| Sample 19 | 60 | 40 | 1.0 | LiPF$_6$: 0.5 mol/kg + LiN (C$_2$F$_5$SO$_2$)$_2$: 0.2 mol/kg |
| Sample 20 | 60 | 40 | 1.0 | LiPF$_6$: 0.2 mol/kg + LiN (C$_2$F$_5$SO$_2$)$_2$: 0.5 mol/kg |
| Sample 21 | 60 | 40 | 1.0 | LiPF$_6$: 0.5 mol/kg + LiN (CF$_3$SO$_2$)$_2$: 0.2 mol/kg |
| Sample 22 | 60 | 40 | 1.0 | LiPF$_6$: 0.2 mol/kg + LiN (CF$_3$SO$_2$)$_2$: 0.5 mol/kg |
| Sample 23 | 60 | 40 | 1.0 | LiBF$_4$: 0.4 mol/kg |
| Sample 24 | 60 | 40 | 1.0 | LiBF$_4$: 0.7 mol/kg |
| Sample 25 | 60 | 40 | 1.0 | LiBF$_4$: 1.0 mol/kg |
| Sample 26 | 60 | 40 | 1.0 | LiClO$_4$: 0.4 mol/kg |
| Sample 27 | 60 | 40 | 1.0 | LiClO$_4$: 0.7 mol/kg |
| Sample 28 | 60 | 40 | 1.0 | LiClO$_4$: 1.0 mol/kg |
| Sample 29 | 49 | 49 | 1.0 | EC:PC:DMC = 49:49:2 |
| Sample 30 | 50 | 40 | 1.0 | EC:PC:TrifluoroPC = 50:40:10 |
| Sample 31 | 40 | 50 | 1.0 | EC:PC:GBL = 40:50:10 |
| Sample 32 | 60 | 40 | 0.5 | No DFA added |
| Sample 33 | 15 | 85 | 0.5 | No DFA added |
| Sample 34 | 75 | 25 | 0.5 | No DFA added |
| Sample 35 | 60 | 40 | 1.0 | No DFA added |
| Sample 36 | 15 | 85 | 1.0 | No DFA added |
| Sample 37 | 75 | 25 | 1.0 | No DFA added |
| Sample 38 | 60 | 40 | 1.0 | Negative electrode: non-graphitizable carbon |
| Sample 39 | 60 | 40 | 1.0 | Positive electrode: LiNi$_{0.8}$Co$_{0.2}$O$_2$ |
| Sample 40 | 60 | 40 | 1.0 | Polymer: polyacrylonitrile + polymethacrylonitrile |

TABLE 3

| | EC ratio (wt %) | PC ratio (wt %) | VC added (wt %) | Other conditions |
|---|---|---|---|---|
| Sample 41 | 80 | 20 | 0.5 | — |
| Sample 42 | 10 | 90 | 0.5 | — |
| Sample 43 | 80 | 20 | 1.0 | — |
| Sample 44 | 10 | 90 | 1.0 | — |
| Sample 45 | 80 | 20 | 1.5 | — |
| Sample 46 | 10 | 90 | 1.5 | — |
| Sample 47 | 80 | 20 | 2.0 | — |
| Sample 48 | 10 | 90 | 2.0 | — |
| Sample 49 | 80 | 20 | 3.0 | — |
| Sample 50 | 10 | 90 | 3.0 | — |
| Sample 51 | 75 | 25 | 5.0 | — |
| Sample 52 | 25 | 75 | 5.0 | — |
| Sample 53 | 60 | 40 | 1.0 | LiPF$_6$: 0.35 mol/kg |
| Sample 54 | 60 | 40 | 1.0 | LiPF$_6$: 1.1 mol/kg |

TABLE 4

| | EC ratio (wt %) | PC ratio (wt %) | VC added (wt %) |
|---|---|---|---|
| Sample 55 | 80 | 20 | 0 |
| Sample 56 | 75 | 25 | 0 |
| Sample 57 | 60 | 40 | 0 |
| Sample 58 | 15 | 85 | 0 |
| Sample 59 | 10 | 90 | 0 |
| Sample 60 | 80 | 20 | 6.0 |
| Sample 61 | 75 | 25 | 6.0 |
| Sample 62 | 60 | 40 | 6.0 |
| Sample 63 | 15 | 85 | 6.0 |
| Sample 64 | 10 | 90 | 6.0 |
| Sample 65 | 80 | 20 | 7.0 |
| Sample 66 | 75 | 25 | 7.0 |
| Sample 67 | 60 | 40 | 7.0 |
| Sample 68 | 15 | 85 | 7.0 |
| Sample 69 | 10 | 90 | 7.0 |

The gel electrolyte cells of Samples 1 to 69 were evaluated in the cycle characteristic, the initial charge/discharge efficiency, the low-temperature discharge characteristic, the load characteristic, and the initial discharge capacity.

It should be noted that in the evaluation method shown below, "1 C." represents a current value discharging the rated cell capacity in 1 hour, and 0.2 C., 0.5 C., and 3 C. represents current values for discharging the rated cell capacity in 5 hours, 2 hours, and 20 minutes, respectively.

For the cycle characteristic, a constant current constant voltage charge of 4.2 V and 1 C., and a 3V cut-off constant current discharge of 1 C. were performed to measure a change per discharge capacity cycle. Here, consideration was taken on the capacity maintaining ratio after 300 cycles and evaluation was defined as good when 80% or above. The capacity maintaining ratio of 80% after 300 cycles is a value generally required in the current specification of portable electronic apparatuses.

(discharge capacity of 300th cycle)/(discharge capacity of 5th cycle)

For the initial charge/discharge efficiency, the initial charge/discharge test was performed with a constant current constant voltage charge with 4.2 V and 0.1 C., constant current discharge of 0.1 C., and cut-off 3V, and the evaluation was made according to the charge/discharge cell capacity. When this value is too small, the percentage of the active material used in vain becomes great. The evaluation was defined as good when the percentage is 80% or above.

(initial discharge capacity)/(initial charge capacity)

For the low-temperature discharge characteristic, evaluation was made according to the ratio of 0.5 C. discharge capacity at −20° C. with respect to the 0.5 C. discharge capacity at 23° C. Evaluation was defined as good when the value was 35% or above. This value corresponds to a cell capacity required to perform a communication with a cellular telephone at a cold place under a temperature around −20° C.

(0.5 C. discharge capacity at −20° C.)/(0.5 C. discharge capacity at 23° C.)

The load characteristic was evaluated by the ratio of 3 C. discharge capacity at room temperature with respect to 0.5 C. discharge capacity. The evaluation was defined as good when the value was 90% or above. The cellular telephone requires a great current performance because electric power is consumed by pulse discharge. The value of 90% or above satisfies the requirement of the telephone.

(3 C. discharge capacity)/(0.5 C. discharge capacity)

The discharge capacity was evaluated with the initial discharge capacity and the evaluation was defined as good when the value is 600 mAh or above from the viewpoint of the cell design.

Tables 5 to 8 show the evaluation results of the cycle characteristic, the initial charge/discharge efficiency, the low-temperature discharge characteristic, the load characteristic, and the initial discharge capacity of the gel electrolyte cells of Samples 1 to 69.

It should be noted that Table 5 shows the cell characteristics evaluation results of Samples 1 to 15. Moreover, Table 6 shows the cell characteristics evaluation results of Samples 16 to 40. Moreover, Table 7 shows the cell characteristics evaluation results of Samples 41 to 54. Moreover, Table 8 shows the cell characteristics evaluation results of Samples 55 to 69.

TABLE 5

|  | Cycle characteristic (%) | Initial charge/ discharge efficiency (%) | Low-temperature characteristic (%) | Load characteristic (%) | Initial charge/ discharge capacity (mAh) |
|---|---|---|---|---|---|
| Sample 1 | 85 | 82 | 46 | 93 | 620 |
| Sample 2 | 81 | 81 | 55 | 98 | 605 |
| Sample 3 | 88 | 84 | 43 | 91 | 630 |
| Sample 4 | 85 | 84 | 45 | 93 | 640 |
| Sample 5 | 81 | 81 | 53 | 98 | 615 |
| Sample 6 | 88 | 88 | 41 | 91 | 667 |
| Sample 7 | 85 | 86 | 43 | 92 | 648 |
| Sample 8 | 81 | 83 | 50 | 97 | 623 |
| Sample 9 | 88 | 90 | 39 | 91 | 675 |
| Sample 10 | 86 | 87 | 41 | 92 | 653 |
| Sample 11 | 81 | 84 | 47 | 96 | 631 |
| Sample 12 | 87 | 91 | 37 | 90 | 681 |
| Sample 13 | 85 | 89 | 39 | 92 | 662 |
| Sample 14 | 81 | 86 | 44 | 95 | 639 |
| Sample 15 | 89 | 92 | 36 | 91 | 689 |

TABLE 6

|  | Cycle characteristic (%) | Initial charge/ discharge efficiency (%) | Low-temperature characteristic (%) | Load characteristic (%) | Initial charge/ discharge capacity (mAh) |
|---|---|---|---|---|---|
| Sample 16 | 84 | 82 | 37 | 92 | 623 |
| Sample 17 | 83 | 85 | 43 | 93 | 644 |
| Sample 18 | 81 | 88 | 36 | 91 | 653 |
| Sample 19 | 85 | 85 | 46 | 93 | 646 |
| Sample 20 | 85 | 87 | 48 | 94 | 653 |
| Sample 21 | 85 | 85 | 45 | 93 | 644 |
| Sample 22 | 84 | 86 | 47 | 94 | 651 |
| Sample 23 | 81 | 82 | 37 | 92 | 633 |
| Sample 24 | 83 | 83 | 39 | 93 | 638 |
| Sample 25 | 85 | 86 | 43 | 93 | 644 |
| Sample 26 | 83 | 82 | 36 | 91 | 615 |
| Sample 27 | 81 | 81 | 37 | 92 | 621 |
| Sample 28 | 80 | 80 | 37 | 91 | 625 |
| Sample 29 | 84 | 86 | 47 | 94 | 637 |
| Sample 30 | 85 | 89 | 41 | 92 | 643 |
| Sample 31 | 81 | 82 | 48 | 94 | 628 |
| Sample 32 | 85 | 81 | 46 | 93 | 618 |
| Sample 33 | 81 | 80 | 54 | 97 | 603 |
| Sample 34 | 88 | 82 | 44 | 92 | 625 |
| Sample 35 | 85 | 82 | 44 | 94 | 637 |
| Sample 36 | 81 | 80 | 53 | 97 | 611 |

TABLE 6-continued

|  | Cycle characteristic (%) | Initial charge/ discharge efficiency (%) | Low-temperature characteristic (%) | Load characteristic (%) | Initial charge/ discharge capacity (mAh) |
|---|---|---|---|---|---|
| Sample 37 | 88 | 86 | 40 | 92 | 660 |
| Sample 38 | 88 | 82 | 39 | 91 | 634 |
| Sample 39 | 83 | 81 | 41 | 92 | 648 |
| Sample 40 | 85 | 84 | 43 | 94 | 640 |

TABLE 7

|  | Cycle characteristic (%) | Initial charge/ discharge efficiency (%) | Low-temperature characteristic (%) | Load characteristic (%) | Initial charge/ discharge capacity (mAh) |
|---|---|---|---|---|---|
| Sample 41 | 89 | 82 | 31 | 86 | 635 |
| Sample 42 | 74 | 73 | 47 | 95 | 582 |
| Sample 43 | 89 | 84 | 32 | 87 | 648 |
| Sample 44 | 75 | 76 | 47 | 94 | 593 |
| Sample 45 | 90 | 85 | 30 | 87 | 655 |
| Sample 46 | 76 | 73 | 46 | 94 | 610 |
| Sample 47 | 90 | 86 | 30 | 86 | 681 |
| Sample 48 | 74 | 74 | 44 | 95 | 615 |
| Sample 49 | 89 | 87 | 29 | 86 | 688 |
| Sample 50 | 75 | 73 | 43 | 94 | 626 |
| Sample 51 | 89 | 89 | 27 | 85 | 691 |
| Sample 52 | 81 | 77 | 35 | 93 | 633 |
| Sample 53 | 65 | 78 | 27 | 90 | 612 |
| Sample 54 | 68 | 89 | 23 | 88 | 661 |

TABLE 8

|  | Cycle characteristic (%) | Initial charge/ discharge efficiency (%) | Low-temperature characteristic (%) | Load characteristic (%) | Initial charge/ discharge capacity (mAh) |
|---|---|---|---|---|---|
| Sample 55 | 89 | 78 | 31 | 87 | 594 |
| Sample 56 | 88 | 73 | 41 | 89 | 578 |
| Sample 57 | 85 | 70 | 45 | 91 | 563 |
| Sample 58 | 81 | 67 | 44 | 92 | 555 |
| Sample 59 | 78 | 63 | 47 | 94 | 542 |
| Sample 60 | 88 | 90 | 25 | 84 | 692 |
| Sample 61 | 88 | 92 | 28 | 88 | 690 |
| Sample 62 | 84 | 90 | 31 | 90 | 664 |
| Sample 63 | 78 | 86 | 32 | 94 | 640 |
| Sample 64 | 74 | 81 | 33 | 92 | 635 |
| Sample 65 | 87 | 91 | 17 | 83 | 687 |
| Sample 66 | 86 | 92 | 25 | 86 | 689 |
| Sample 67 | 82 | 91 | 28 | 88 | 661 |
| Sample 68 | 79 | 89 | 32 | 91 | 637 |
| Sample 69 | 75 | 83 | 33 | 88 | 629 |

As is clear from Tables 5 to 8, in the gel electrolyte cell using a mixed solvent of ethylene carbonate and propylene carbonate, addition of vinylene carbonate in the gel electrolyte can significantly increase the charge/discharge efficiency and the cell capacity. Furthermore, the cycle characteristic can also be improved when propylene carbonate is contained in a great amount.

Moreover, preferable characteristics can be obtained when the content of vinylene carbonate is in a range not less than 0.05 wt % and no greater than 5 wt % and more preferably, in a range not less than 0.5 wt % and not greater than 3 wt % with respect to the non-aqueous electrolytic solution in the gel electrolyte.

When the content of vinylene carbonate is smaller than 0.05 wt %, the gel strength and stability are not sufficient and it is impossible to obtain a sufficient effect to increase the charge/discharge efficiency or to obtain a high cell capacity or cycle characteristic. The initial charge/discharge efficiency and the cell capacity significantly increase as the content of vinylene carbonate increases. Moreover, the effect to suppress the cell swelling is also increased. However, when the content of vinylene carbonate exceeds 5 wt %, the load characteristic is slightly lowered and the low-temperature characteristic is significantly lowered.

On the other hand, as for the non-aqueous solvent composition of the non-aqueous electrolytic solution, preferable characteristics can be obtained when the weight ratio of the ethylene carbonate and propylene carbonate is in a range of 15:85 to 75:25. When the content of ethylene carbonate exceeds this range, the low-temperature characteristic is deteriorated. Moreover, when the content of propylene carbonate is too large, the initial charge/discharge efficiency and the cell capacity are not sufficient.

Moreover, as for the electrolyte salt concentration, preferable characteristics can be obtained when the lithium ion concentration against the non-aqueous solvent is not less than 0.4 mol/kg and not greater than 1.0 mol/kg. When the electrolyte salt concentration exceeds 1.0 mol/kg, the lower-temperature characteristic and the cycle characteristic are deteriorated. Moreover, when the electrolyte salt concentration is below 0.4 mol/kg, it is impossible to assure a sufficient capacity. Moreover, by using imide-based salt, it is possible to improve the lower-temperature characteristic and the cell capacity.

Moreover, by adding difluoroanisole to the non-aqueous electrolytic solution, it is possible to further improve the charge/discharge efficiency of the gel electrolyte cell and to obtain a high discharge capacity.

Moreover, a study has been made on the cell swelling due to gas generation at the initial charge. The cell swelling was evaluated by the ratio of the cell volume immediately before discharge with respect the cell volume immediately after the initial charge.

As a result, in the cells of Samples 1 to 3 in which 0.5 wt % of VC was added, the cell volume immediately after the initial charge against the cell volume immediately before charge was 103.9%. Moreover, in the cells of Samples 4 to 6 in which 1.0 wt % of VC was added, the cell volume immediately after the initial charge against the cell volume immediately before the charge was 103.6%. Moreover, in the cells of Samples 7 to 9 in which 2.0 wt % of VC was added, the cell volume immediately after the initial charge against the cell volume immediately before the charge was 101.3%. Moreover, in the cells of Samples 10 to 12 in which 3.0 wt % of VC was added, the cell volume immediately after the initial charge against the cell volume immediately before the charge was 100.6%. Moreover, in the cells of Samples 13 to 15 in which 5.0 wt % of VC was added, the cell volume immediately after the initial charge against the cell volume immediately before the charge was 100.1%. On the other hand, in the cells of Samples 55 to 59 in which no VC was added, the cell volume immediately after the initial charge against the cell volume immediately before the charge was 109.8%.

As has been described above, in the gel electrolyte cell using a mixture solvent of ethylene carbonate and propylene carbonate, by adding vinylene carbonate to the gel electrolyte, it is possible to suppress gas generation and resulting cell swelling even if propylene carbonate is contained in a great amount. Moreover, as the content of vinylene carbonate increases, its effect also increases.

In the cells of Samples 60 to 64 in which 6.0 wt % of VC was added, the cell volume immediately after the initial charge against the cell volume immediately before the charge was 100.0 %, and in the cells of Samples 65 to 69 in which 7.0 wt % of VC was added, the cell volume immediately after the initial charge against the cell volume immediately before the charge was 100.0%. From the viewpoint of suppressing the cell swelling, it is preferable to increase the content of the vinylene carbonate. However, as has been described above, when the content of vinylene carbonate is too great, the load characteristic and the low-temperature characteristic are lowered.

In the gel electrolyte according to the present invention, vinylene carbonate or its derivative is added. This improves the chemical stability of the gel electrolyte and the negative electrode.

The gel electrolyte cell according to the present invention using such gel electrolyte having an excellent chemical stability, strength, and liquid-retention characteristic exhibits an excellent cell capacity, cycle characteristic, load characteristic, and low-temperature characteristic. The gel electrolyte cell realizing such excellent characteristics according to the present invention can greatly contribute to the industrial development of portable electronic apparatuses.

What is claimed is:

1. A gel electrolyte comprising a non-aqueous electrolytic solution containing lithium-containing electrolyte salt solved in a non-aqueous mixture solvent containing ethylene carbonate and propylene carbonate with a mixing ratio in the range of 15:85 to 75:25 and made into a gel state by a matrix polymer, wherein the gel electrolyte contains vinylene carbonate or derivative thereof in the amount not less than 0.05 wt % and not greater than 5 wt % with respect to the non-aqueous solution.

2. A gel electrolyte as claimed in claim 1, wherein the gel electrolyte contains as said lithium salt at least $LiPF_6$, $LiBF_4$, $LiN(CF_3SO_2)_2$ or $LiN(C_2F_5SO_2)_2$, and said non-aqueous electrolytic solution contains lithium salt in the range not less than 0.4 mol/kg and not greater than 1.0 mol/kg.

3. A gel electrolyte as claimed in claim 1, wherein said matrix polymer contains as a repetition unit at least one selected from a group consisting of polyvinylidene fluoride, polyethylene oxide, polypropylene oxide, polyacrylonitrile, and polymethacrylonitrile.

4. A gel electrolyte as claimed in claim 3, wherein said matrix polymer contains polyvinylidene fluoride or a copolymer of polyvinylidene fluoride copolymerized with hexafluoropropylene at a ratio not greater than 7.5%.

5. A gel electrolyte as claimed in claim 1, wherein said non-aqueous electrolytic solution contains difluoroanisole in the amount not less than 0.2 wt % and not greater than 2 wt %.

6. A gel electrolyte cell comprising:

a negative electrode having a lithium metal or lithium alloy or carbon material capable of doping/dedoping lithium;

a positive electrode having a composite oxide of lithium and a transition metal; and a gel electrolyte arranged between said positive electrode and said negative electrode;

wherein said gel electrolyte is a non-aqueous electrolytic solution containing lithium-containing electrolyte salt solved in a non-aqueous mixture solvent containing ethylene carbonate and propylene carbonate with a mixing ratio in the range of 15:85: to 75:25 and made into a gel state by a matrix polymer, and the gel electrolyte contains vinylene carbonate or derivative thereof in the amount not less than 0.05 wt % and not greater than 5 wt % with respect to the non-aqueous solution.

7. A gel electrolyte cell as claimed in claim 6, wherein the gel electrolyte contains as said lithium salt at least $LiPF_6$, $LiBF_4$, $LiN(CF_3SO_2)$ or $LiN(C_2F_5SO_2)_2$, and said non-aqueous electrolytic solution contains lithium salt in the range not less than 0.4 mol/kg and not greater than 1.0 mol/kg.

8. A gel electrolyte cell as claimed in claim 6, wherein said matrix polymer contains as a repetition unit at least one selected from a group consisting of polyvinylidene fluoride, polyethylene oxide, polypropylene oxide, polyacrylonitrile, and polymethacrylonitrile.

9. A gel electrolyte cell as claimed in claim 8, wherein said matrix polymer contains polyvinylidene fluoride or a copolymer of polyvinylidene fluoride copolymerized with hexafluoropropylene at a ratio not greater than 7.5%.

10. A gel electrolyte cell as claimed in claim 6, wherein said non-aqueous electrolytic solution contains difluoroanisole in the amount not less than 0.2 wt % and not greater than 2 wt %.

11. A gel electrolyte cell comprising:

a rolled electrode body formed by, through a gel electrolyte, winding a negative electrode which incorporates an elongated negative electrode current collector having two sides on each of which an active material for the negative electrode has been formed and a positive electrode which incorporates an elongated positive electrode current collector having two sides on each of which an active material for the positive electrode has been formed, wherein said negative active material being a lithium metal or lithium alloy or carbon material capable of doping/dedoping lithium;

said positive active material being a composite oxide of lithium and a transition metal;

said gel electrolyte being a non-aqueous electrolytic solution containing lithium-containing electrolyte salt solved in a non-aqueous mixture solvent containing ethylene carbonate and propylene carbonate with a mixing ratio in the range of 15:85 to 75:25 and made into a gel state by a matrix polymer, and the gel electrolyte contains vinylene carbonate or derivative thereof in the amount not less than 0.05 wt % and not greater than 5 wt % with respect to the non-aqueous solution.

* * * * *